United States Patent [19]

Sakai

[11] Patent Number: 5,114,175
[45] Date of Patent: May 19, 1992

[54] VEHICLE WHEEL SUSPENSION WITH QUADRILATERAL LINK STRUT

[75] Inventor: Hideki Sakai, Susono, Japan

[73] Assignee: Toyota Jidosha Kabushiki Kaisha, Aichi, Japan

[21] Appl. No.: 708,296

[22] Filed: May 31, 1991

[30] Foreign Application Priority Data

Jun. 5, 1990 [JP] Japan .................................. 2-146602

[51] Int. Cl.⁵ .................................................. B60G 3/20
[52] U.S. Cl. ...................................... 280/675; 280/690; 280/691
[58] Field of Search ............... 280/675, 688, 690, 691, 280/692, 695, 696, 715, 723, 725

[56] References Cited

U.S. PATENT DOCUMENTS

| | | | |
|---|---|---|---|
| 3,759,542 | 9/1973 | Loffler | 280/692 |
| 3,831,970 | 8/1974 | Muller | 280/692 |
| 3,881,741 | 5/1975 | Müller | 280/696 X |
| 4,033,605 | 7/1977 | Smith et al. | 280/664 |
| 4,614,359 | 9/1986 | Lundin et al. | 280/692 X |
| 4,715,614 | 12/1987 | Kijima et al. | 280/690 X |
| 4,955,635 | 9/1990 | Haraguchi | 280/675 |
| 4,968,056 | 11/1990 | Haraguchi | 280/690 |

OTHER PUBLICATIONS

Toyota Catalog, 2 pages.

Primary Examiner—Charles A. Marmor
Assistant Examiner—Tamara L. Finlay
Attorney, Agent, or Firm—Oliff & Berridge

[57] ABSTRACT

In a suspension device for a vehicle wheel in a vehicle having a carrier for supporting the vehicle wheel, an upper arm pivotably connected with an upper portion of the carrier at an outboard end thereof and connected with a body of the vehicle at an inboard end thereof to be pivotable about a substantially horizontal and longitudinal first axis of revolution, and a lower arm pivotably connected with a lower portion of the carrier at an outboard end thereof and with the body of the vehicle at an inboard end thereof, the forward and rearward movement of the outboard end of the lower arm is restricted by a quadrilateral link mechanism formed of the lower arm, a first strut member pivotably connected with an outboard portion of the lower arm at a rear end thereof and with the body of the vehicle at a front end thereof, a second strut member pivotably connected with an outboard portion of the lower arm at a rear end thereof and with the body of the vehicle at a front end thereof, and the vehicle body, wherein a first phantom straight line which passes the rear and front pivot points of the first strut member and a second phantom straight line which passes the rear and front pivot points of the second strut member substantially traverse a third phantom straight line passing a center of the pivotable connection of the inboard end of the lower arm with the vehicle body on a front side of the lower arm, the third phantom straight line substantially traversing the first axis of revolution on a rear side of the lower arm.

5 Claims, 3 Drawing Sheets

VEHICLE WHEEL SUSPENSION WITH QUADRILATERAL LINK STRUT

BACKGROUND OF THE INVENTION

1. Field of the Invention

The present invention relates to a suspension of a vehicle wheel in a vehicle such as an automobile, and more particularly, to a suspension device of the type constructed by a combination of a plurality of links.

2. Description of the Prior Art

As a very common structure of the link type vehicle wheel suspension it is known, as diagrammatically shown in FIG. 1, to support a carrier 10 for supporting a vehicle wheel 12 to be rotatable about a central axis of rotation thereof such as A by an upper arm such as an A-type arm 16 connected with an upper portion of the carrier 10 at an outboard end thereof via a pivot joint 18 to be pivotable relative to one another about at least one substantially horizontal and longitudinal axis of revolution also connected with a body 24 of the vehicle at an inboard end thereof via pivot joints such as 20 and 21 provided at the free ends of the two leg portions of the A-type arm to be pivotable relative to one another about a substantially horizontal and longitudinal axis of revolution, and a lower arm 26 connected with a lower portion of the carrier 10 at an outboard end thereof via a pivot joint 28 to be pivotable relative to one another about at least one substantially horizontal and longitudinal axis of revolution and also connected with the body 24 of the vehicle at an inboard end thereof via a pivot joint 30 to be pivotable relative to one another about a substantially horizontal and longitudinal axis of revolution and to have at least a certain small freedom of revolution about a substantially vertical axis of revolution, wherein forward and rearward movements of the outboard end of the lower arm 26 are restricted by a strut member 48 firmly connected with an outboard portion of the lower arm 26 at a rear end thereof and connected with the body 24 of the vehicle at a front end thereof via a pivot joint 54 to be pivotable relative to one another about a substantially horizontal and longitudinal axis of revolution. When the vehicle wheel supported by such a suspension device is a steering vehicle wheel, the carrier 10 is also pivotable relative to the upper arm 16 and the lower arm 26 about a substantially vertical axis of revolution via the pivot joints 18 and 28 which may be ball joints, and the carrier 10 is steered by a knuckle arm 32 mounted thereto being operated by a steering tie rod not shown in the figure.

In such a suspension device, in order to obtain a condition that an instant center of movement of the vehicle wheel is stably maintained at a certain point in the bounding and rebounding movement of the vehicle wheel so that the bounding or rebounding of the vehicle wheel does not cause any abrupt change of orientation of the axis of rotation of the vehicle wheel which would cause a dynamic instability due to the Coriolis' effect of the like, the link mechanism constructed by the carrier 10, the upper arm 16, the lower arm 26, the strut member 48 and the vehicle body 24 is generally so arranged that a phantom straight line such as K passing the pivot points 30 and 54 traverse substantially the axis of revolution in the pivotal connection between the upper arm 16 and the vehicle body 24 which is substantially horizontal and longitudinal as indicated by H at a point such as O which provides the instant center of the bounding and rebounding movement of the vehicle wheel. Herein it is conditioned that the line K traverses substantially the line H, because although two straight lines having different inclinations will exactly traverse one another in a plane geometry, in a three dimensional geometry applied to an actual product of suspension device, it requires a very high precision for any two straight lines to traverse exactly one another beyond a degree practically available and enough for certain objects, functions and advantages desired to be accomplished. Therefore, the concept of "substantially traversing" is used with regard to two straight lines in the present application to provide an allowance for an exact geometric traversing of two straight lines within a range which does not substantially affect the objects, functions and advantages of the invention.

When the vehicle wheel supported by such a suspension device is a front vehicle wheel, it is desirable that the instant center of the bounding and rebounding movement of the vehicle wheel, i.e., O, is relatively close to the axis of rotation of the vehicle wheel, A, from the view point of improving the anti-nose diving performance in the braking of the vehicle, in which the mass of a front portion of the vehicle body under the inertia would ride on the braked vehicle wheel by turning about a point of contact T of the vehicle wheel with the ground surface G as supported from the vehicle wheel by a phantom arm R expanded between the point T and the point O, as if the mass of the front portion of the vehicle body were centralized at the point O, thereby generating a greater force for pushing up the front portion of the vehicle body against the nose diving as an angle of inclination j of the phantom arm R from the ground surface G is greater. In order to dispose the point O relatively close to the center of the vehicle wheel, A, as is more readily understood in FIG. 3 showing also diagrammatically the suspension mechanism shown in FIG. 1 as viewed from the inboard side thereof, the pivot joint 30 is required to be as high as possible, while the pivot joint 54 is required to be as low as possible. However, it is often difficult to dispose the pivot joint 30 as high as required because of certain interference thereof with other parts of the vehicle such as a steering gear box, particularly when the vehicle wheel is a steering vehicle wheel. On the other hand, it decreases the bottom height of the vehicle to lower the pivot joint 54.

SUMMARY OF THE INVENTION

In view of the above-mentioned problems in the conventional link type suspension as shown in FIGS. 1 and 3, it is a primary object of the present invention to provide a new link type suspension device in which the instant center of the bounding and rebounding movement of the vehicle wheel is disposed relatively close to the axis of rotation of the vehicle wheel with the pivot joint at the inboard end of the lower arm being disposed not be inconveniently high in view of other conditions of construction of the vehicle while also ensuring the bottom vehicle height to be as high as desirable.

Further, it is a secondary object of the present invention to provide a new link type suspension device in which the instant center of the bounding and rebounding movement of the vehicle wheel disposed on the rear side of the axis of rotation of the vehicle wheel shifts forward along with the bounding movement of the vehicle wheel so that the anti-nose diving performance of the suspension is enhanced as the vehicle wheel bounds in the braking of the vehicle.

The above-mentioned primary and secondary objects are both accomplished according to the present invention by a suspension device for a vehicle wheel in a vehicle, comprising:

a carrier for supporting said vehicle wheel to be rotatable about a central axis of rotation thereof;

an upper arm connected with an upper portion of said carrier at an outboard end thereof to be pivotable relative to one another about at least one substantially horizontal and longitudinal first axis of revolution and also connected with a body of the vehicle at an inboard end thereof to be pivotable relative to one another about a substantially horizontal and longitudinal axis of revolution;

a lower arm connected with a lower portion of said carrier at an outboard end thereof to be pivotable relative to one another about at least one substantially horizontal and longitudinal axis of revolution and also connected with the body of the vehicle at an inboard end thereof to be pivotable relative to one another about a substantially horizontal and longitudinal axis of revolution to have a certain small freedom for revolution about a substantially vertical axis of revolution;

a first strut member connected with an outboard portion of said lower arm at a rear end thereof to be pivotable relative to one another in substantially all directions of revolution for at least a certain small amount of revolution about a first point of revolution and also connected with the body of the vehicle at a front end thereof to be pivotable relative to one another in substantially all directions of revolution for at least a certain small amount of revolution about a second point of revolution;

a second strut member connected with an outboard portion of said lower arm at a rear end thereof to be pivotable relative to one another in substantially all directions of revolution for at least a certain small amount of revolution about a third point of revolution and also connected with the body of the vehicle at a front end thereof to be pivotable relative to one another in substantially all directions of revolution for at least a certain small amount of revolution about a fourth point of revolution;

wherein a first phantom straight line which passes said first point of revolution and said second point of revolution and a second phantom straight line which passes said third point of revolution and said fourth point of revolution substantially traverse a third phantom straight line passing a center of the pivotable connection of said inboard end of said lower arm with the vehicle body on a front side of said lower arm, said third phantom straight line substantially traversing said first axis of revolution on a rear side of said lower arm.

According to the above-mentioned construction, said lower arm, said first strut member, said second strut member and the body of the vehicle connected with each other via said respective pivot joints form a quadrilateral link mechanism which turns as a whole about said third phantom straight line in the bounding and rebounding movement of the vehicle wheel. Therefore, when said first and second phantom straight lines traverse said third phantom straight line in the extensions thereof beyond said front ends of said first and second strut members, the pivot point at the end for connection with the vehicle body of the strut member for restricting the forward and rearward movement of the outboard end of the lower, which is now the two pivot points at the front ends of said first and second strut members, is disposed above the axis of revolution of the lower arm in the bounding and rebounding movement of the vehicle wheel. Therefore, the difference in height between the inboard end of the lower arm and the front end of said first strut member or the front end of said second strut member is substantially decreased as compare with the difference in height between the inboard end of the lower arm and the front end of the strum member in the conventional suspension device when the same nearness of the instant center of the bounding and rebounding movement of the vehicle wheel to the axis of rotation thereof is obtained.

Further, since the above-mentioned quadrilateral link mechanism is deformed in the bounding movement of the vehicle wheel relative to the vehicle body in such a manner that the rear ends of said first and second strut members are raised relative to the front ends thereof, said third phantom straight line is more inclined to be more low on the front side of the inboard end of the lower arm which it traverses and to be more high on the rear side of the inboard end of the lower arm, and therefore, said third phantom straight line traverses said first axis of revolution at a point more close to the axis of rotation of the vehicle wheel. Therefore, the anti-nose diving performance is enhanced as the vehicle wheel bounds relative to the vehicle body.

In the above-mentioned suspension device, said lower arm may have a main body extending substantially horizontally from said inboard end thereof to said outboard end thereof and an arm portion extending substantially vertically from an outboard portion of said main body, and at least one of said first and second strut members may be connected with said lower arm at said arm portion thereof.

In the above-mentioned suspension device, said second strut member may be provided by an outboard portion of a stabilizer which includes a central portion integrally supporting a pair of said outboard portions thereof at opposite ends thereof for suppressing rolling of the body of the vehicle by reacting the bounding or rebounding of one of a pair of vehicle wheels against the rebounding or bounding of the other of said pair of vehicle wheels, respectively.

In the above-mentioned suspension device, said upper arm may be an A-type arm having two leg portions joined integrally with one another at said outboard end thereof, free ends of said two leg portions providing said inboard end thereof.

In the above-mentioned suspension device, said carrier and said upper arm may be connected to be pivotable relative to one another also about a substantially vertical axis of revolution, while said carrier and said lower arm are also connected to be pivotable relative to one another also about a substantially vertical axis of revolution, so that the suspension device is operable to steer the vehicle.

BRIEF DESCRIPTION OF THE DRAWING

In the accompanying drawings.

DESCRIPTIONS OF THE PREFERRED EMBODIMENTS

Figure 1:
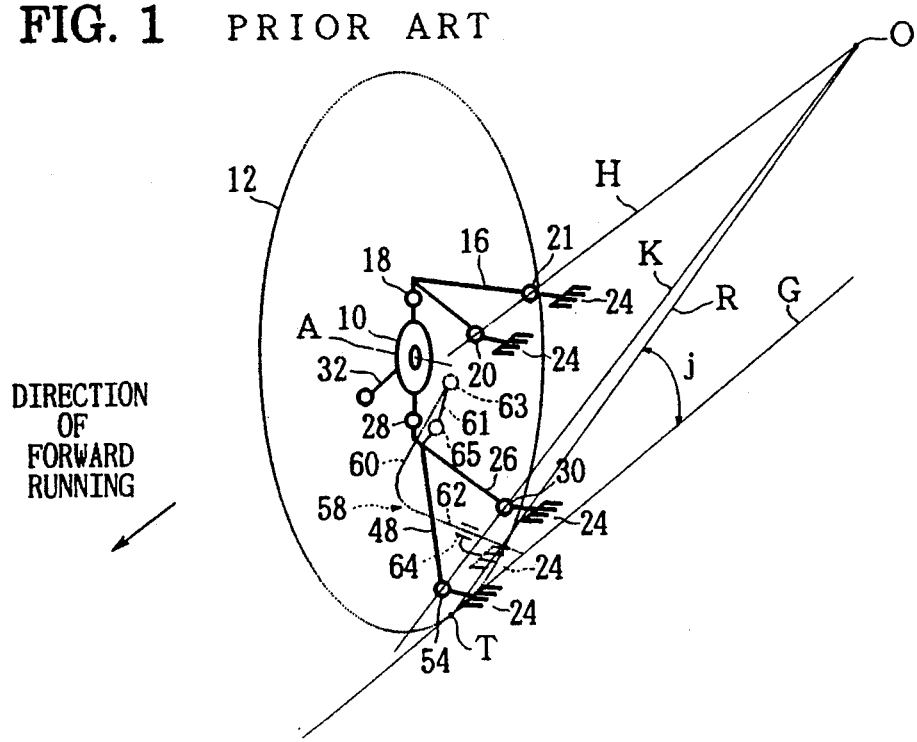
FIG. 1 is a perspective view in a diagrammatical illustration of a conventional link type suspension device for a front right steering vehicle wheel as viewed from a front inboard side of the vehicle.
Figure 2:
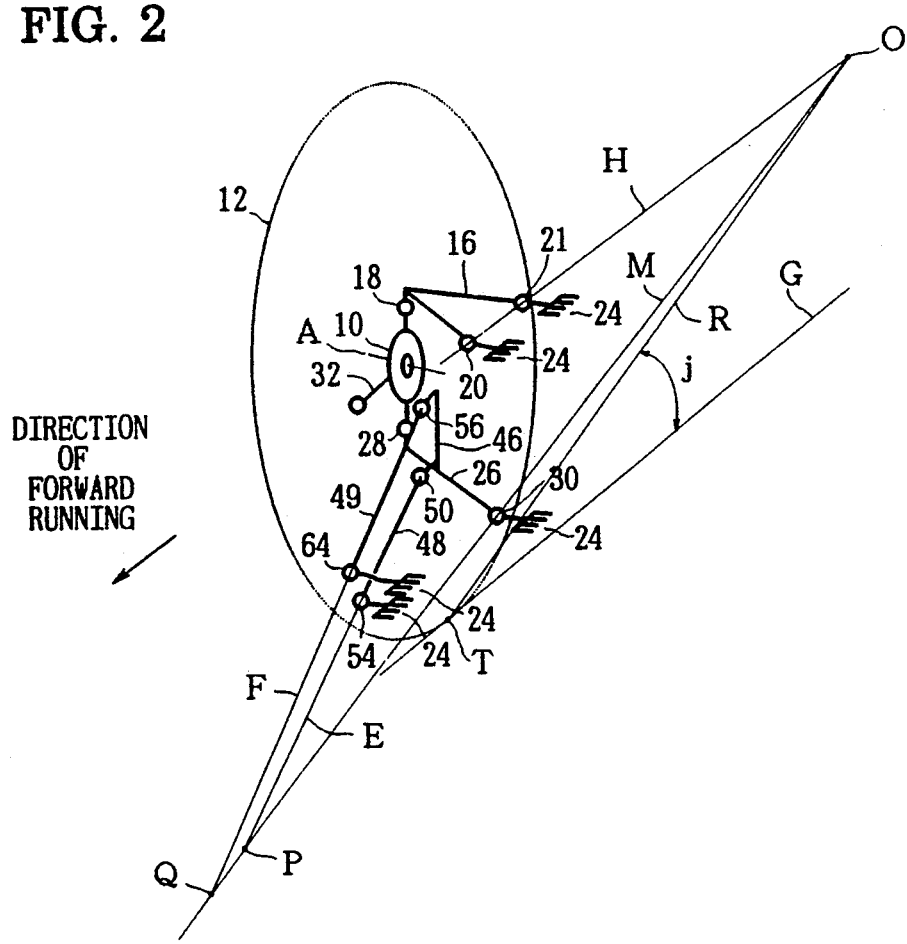
FIG. 2 is a perspective view in the same diagrammatical illustration and according to the same angle of view as in FIG. 1 of an embodiment of the suspension device according to the present invention.

In FIG. 2, an embodiment of the suspension device according to the present invention is illustrated in the same diagrammatical manner as in FIG. 1 to comprise the same components as the suspension device shown in FIG. 1 as long as they may be of the same construction as in the conventional device. Those components which are in common with the conventional suspension device shown in FIG. 1 are illustrated in the same diagrammatical manner and designated by the same reference numerals as in FIG. 1. Therefore, so far as being common with the conventional device, also in the suspension device shown in FIG. 2, a carrier 10 for supporting a vehicle wheel 12 to be rotatable about a central axis of rotation thereof, A, is supported by an upper arm 16 which may also be an A-type arm connected with an upper portion of the carrier 10 at an outboard end thereof to be pivotable relative to one another about at least one substantially horizontal and longitudinal axis of revolution via a pivot joint 18 and also connected with a body 24 of the vehicle at an inboard end thereof provided by a pair of leg portions of the A-type arm to be pivotable relative to one another about a substantially horizontal and longitudinal axis of revolution, H, and a lower arm 26 connected with a lower portion of the carrier 10 at an outboard end thereof via a pivot joint 28 to be rotatable relative to one another about at least one substantially horizontal and longitudinal axis of revolution and also connected with the body 24 of the vehicle at an inboard end thereof via a pivot joint 30 to be pivotable relative to one another about a substantially horizontal and longitudinal axis of revolution and to have a certain small freedom of revolution about a substantially vertical axis of revolution.

Also in this embodiment, the suspension device is constructed to be operable as a steering suspension by the pivot joint 18 and 28 each being constructed as a ball joint so that the carrier 10 is pivotable relative to the upper arm 16 and the lower arm 26 about a substantially vertical axis of revolution for steering. The carrier 10 is also equipped with a knuckle arm 32 adapted to be operated by a steering tie rod not shown in the figure.

Instead of the strut member 48 in the conventional suspension device shown in FIG. 1, in the suspension device shown in FIG. 2 the movement of the lower arm 26 about the pivot joint 30 is determined by a quadrilateral link mechanism constructed by the lower arm 26, a first strut member 48 connected with an outboard portion of the lower arm 26 at a rear end thereof via a pivot joint 50 to be pivotable relative to one another in substantially all directions of revolution for at least a certain small amount of revolution about a first point of revolution provided by the pivot joint 50 and also connected with the body 24 of the vehicle at a front end thereof via a pivot joint 54 to be pivotable relative to one another in substantially all directions of revolution for at least a certain small amount of revolution about a second point of revolution provided by the pivot joint 54, a second strut member 49 connected with an outboard portion of said lower arm 26 at a rear end thereof by a pivot joint 56 to be pivotable relative to one another in substantially all directions of revolution for at least a certain small amount of revolution about a third point of revolution provided by the pivot joint 56 and also connected with the body 24 of the vehicle at a front end thereof by a pivot joint 64 to be pivotable relative to one another in substantially all directions of revolution for at least a certain small amount of revolution about a fourth point of revolution provided by the pivot joint 64, and the vehicle body 24 which supports each half member of the pivot joints 54 and 64 at each determinate position relative to the vehicle body. In the shown embodiment each half member of the pivot joints 50 and 56 on the side of the lower arm 26 are supported by an arm portion 46 extending substantially vertically from an outboard portion of a main body of the lower arm 26 which extends substantially horizontally from the inboard end thereof connected with the vehicle body 24 to the outboard end thereof connected with the carrier 10.

The first strut member 48 and the second strut member 49 extend respectively from their rear ends connected with the lower arm 26 via the pivot joints 50 and 56 forward and downward toward their front ends connected with the vehicle body 24 via the pivot joints 54 and 64, respectively, so that a phantom straight line such as E passing said first point of revolution provided by the pivot joint 50 and said second point of revolution provided by the pivot joint 54 and a phantom straight line such as F passing said third point of revolution provided by the pivot joint 56 and said fourth point of revolution provided by the pivot joint 64 extend each in a certain determinate orientation of going down and forward in the vehicle and substantially traversing a phantom straight line such as M at points P and Q, respectively, said phantom straight line M extending in a certain determinate orientation to pass the pivot joint 30 with an inclination so as to be lower than the pivot joint 30 on a front side thereof and higher than the pivot joint 30 on a rear side thereof and further to substantially traverse the axis of revolution H of the pivot joints 20 and 21 between the upper arm 16 and the vehicle body 24.

When such a geometric link mechanism is constructed, the upper portion of the carrier 10 connected with the upper arm 16 by the pivot joint 18 turns about the axis of revolution H when the vehicle wheel bounds or rebounds relative to the vehicle body. On the other hand, the lower portion of the carrier 10 connected with the lower arm 26 by the pivot joint 28 turns about the phantom straight line M when the vehicle wheel bounds or rebounds relative to the vehicle body.

Figure 3:
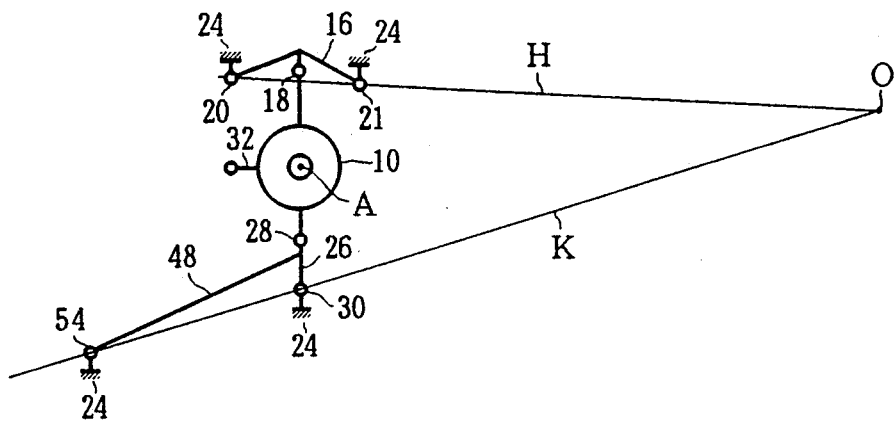
FIG. 3 is a diagrammatical illustration of the conventional suspension device shown in FIG. 1 as viewed from the inboard side thereof.
Figure 4:
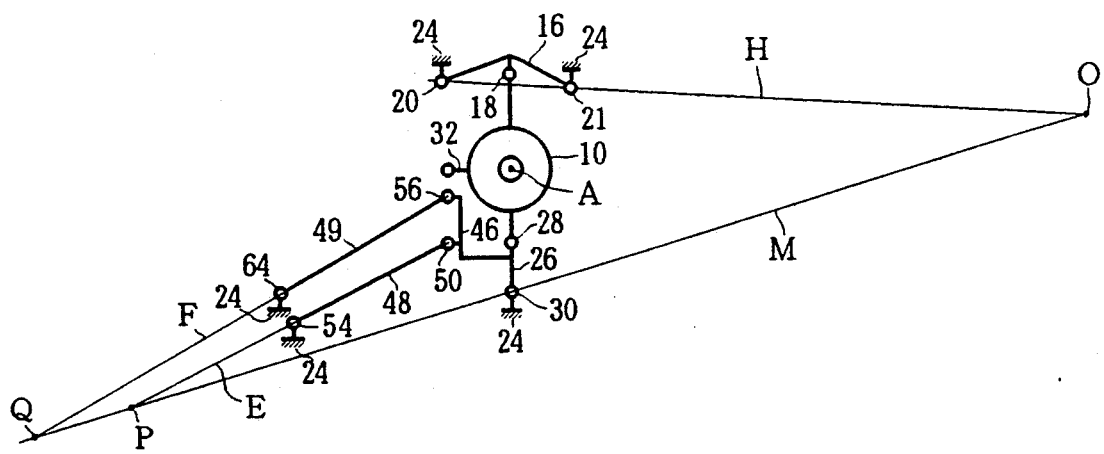
FIG. 4 is a diagrammatical illustration in the same diagrammatical illustration and according to the same angle of view as in FIG. 3 of the suspension device shown in FIG. 2.

As is apparent from a comparison of FIGS. 3 and 4, in order to obtain a similar nearness of the instant center of the bounding and rebounding movement of the vehicle wheel, O, to the axis of rotation thereof, A, the difference in height between the pivot joint 30 and the pivot joint 54 or 64 in the suspension device in FIG. 4 is much smaller than that between the pivot joint 30 and the pivot joint 54 in the suspension device in FIG. 3. Therefore, according to the present invention the pivot joint 30 may be disposed at a relatively low position, while the pivot joints 54 and 64 may be disposed at a relatively high position.

Figure 5:
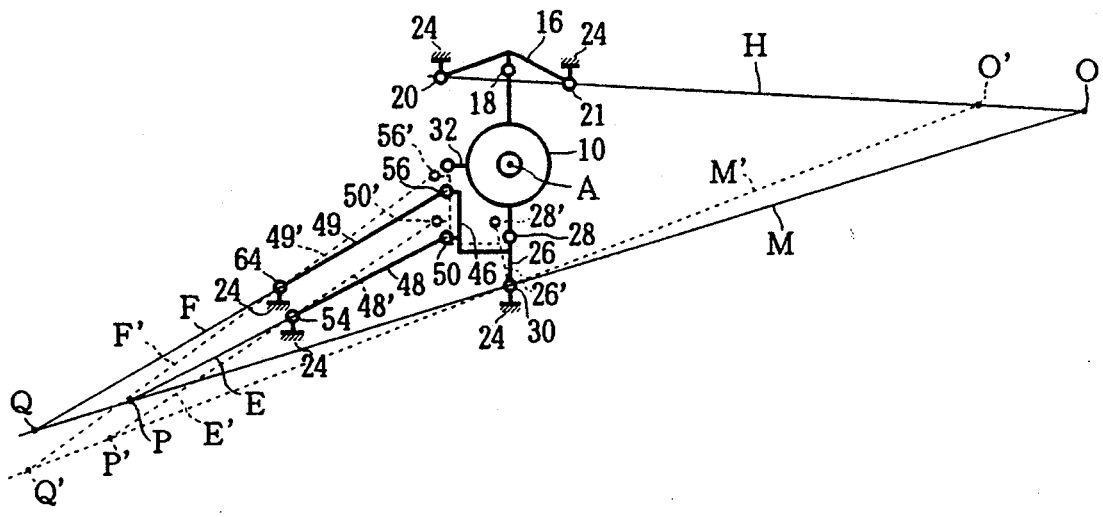
FIG. 5 is the same diagrammatical illustration as FIG. 4, showing how the instant center of the bounding and rebounding movement of the vehicle wheel shifts toward the axis of rotation of the vehicle wheel when the vehicle wheel bound relative to the vehicle body.

When the vehicle wheel bounds relative to the vehicle body in the suspension device shown in FIGS. 2 and 4, the lower arm 26 and the strut members 48 and 49 turn about the pivot joints 30, 54 and 64, respectively, as shown in broken lines in FIG. 5, in which the positions of the related components after such shiftings are designated by the corresponding reference numerals bearing the prime ('). According to such shiftings of the related components the phantom straight line M shifts as shown by M', and as a result the instant center of the bounding and rebounding movement of the vehicle wheel shifts from the point O to a point O' so as to approach the axis of rotation A. Therefore, the angle of inclination j illustrated in FIG. 2 increases, and therefore, the anti-nose diving performance is enhanced as the vehicle wheel would bound more in the braking of the vehicle.

Figure 6:
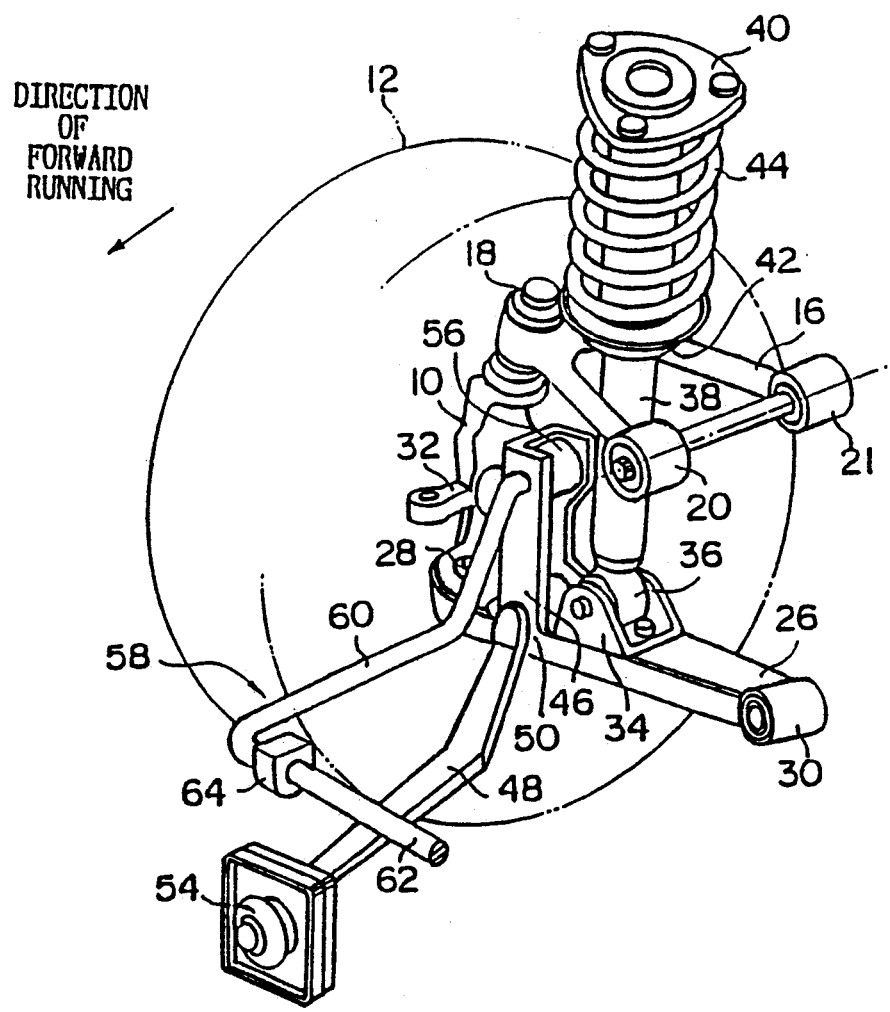
FIG. 6 is a perspective view showing another embodiment of the suspension device according to the present invention in a more practical design.

FIG. 6 shows an embodiment of the suspension device according to the present invention in a more practical design. The structure of the suspension device shown in FIG. 6 is substantially the same as that of the suspension device shown in FIGS. 2, 4 and 5. However, as a modification available in the present invention the strut member 49 is provided by a portion of a stabilizer which itself is well known in the art as a means to suppress the rolling of the vehicle body by reacting the bounding or rebounding of one of a pair of vehicle wheels against the rebounding or bounding of the other of the pair of vehicle wheels, respectively, but which, however, is substantially modified from the conventional construction so as to operate as the stabilizer as well as the strut member according to the present invention. When a conventional stabilizer is incorporated in the conventional suspension shown in FIG. 1, it will comprise, in view of its function, as shown by a dot line therein, a pair of end portion 60 one of which is shown in the figure and a central portion 62 integrally supporting the pair of end portions at opposite ends thereof, wherein the rear end of the end portion 60 will be connected with the lower arm 26 by way of a link member 61 which is connected with the rear end of the end portion 60 via a pivot joint 63 at one end thereof and with the lower arm 26 at the other end thereof via a pivot joint 65. Such a conventional stabilizer is not operable as the strut member 49 in the present invention. According to the modification of the present invention, the end portion 60 of the stabilizer is directly connected with the lower arm 26 by a the pivot joint 56 so as to be able to define the above-mentioned quadrilateral link mechanism with the related components.

In FIG. 6, the portions corresponding to those shown in FIGS. 2, 4 and 5 are designated by the same reference numerals as in FIGS. 2, 4 and 5. In the shown embodiment, the end portion 60 of the stabilizer and the strut member 48 are slightly bent as viewed from the top of the vehicle at each middle portion thereof so that the middle portion is shifted to the inboard side to avoid interference with the vehicle wheel 12 when it is steered for a left turn. Further, the suspension device shown in FIG. 6 in the more practical manner further comprises a shock absorber 38 connected with the lower arm 26 via a pivot joint 36 at a lower end thereof and connected with the vehicle body at an upper end thereof via an upper sheet 40, and a coil spring 44 mounted between the upper sheet 40 and a lower half member of the shock absorber via a lower sheet 42. These additional constructions are of course conventional.

Although the invention has been described in detail with respect to some preferred embodiments thereof, it will be apparent for those skilled in the art that various modifications are possible without departing from the scope of the present invention.

I claim:

1. A suspension device for a vehicle wheel in a vehicle, comprising:

a carrier for supporting said vehicle wheel to be rotatable about a central axis of rotation thereof;

an upper arm connected with an upper portion of said carrier at an outboard end thereof to be pivotable relative to one another about at least one substantially horizontal and longitudinal first axis of revolution and also connected with a body of the vehicle at an inboard end thereof to be pivotable relative to one another about a substantially horizontal and longitudinal axis of revolution;

a lower arm connected with a lower portion of said carrier at an outboard end thereof to be pivotable relative to one another about at least one substantially horizontal and longitudinal axis of revolution and also connected with the body of the vehicle at an inboard end thereof to be pivotable relative to one another about a substantially horizontal and longitudinal axis of revolution and to have a certain small freedom of revolution about a substantially vertical axis of revolution;

a first strut member connected with an outboard portion of said lower arm at a rear end thereof to be pivotable relative to one another in substantially all directions of revolution for at least a certain small amount of revolution about a first point of revolution and also connected with the body of the vehicle at a front end thereof to be pivotable relative to one another in substantially all directions of revolution for at least a certain small amount of revolution about a second point of revolution;

a second strut member connected with an outboard portion of said lower arm at a rear end thereof to be pivotable relative to one another in substantially all directions of revolution for at least a certain small amount of revolution about a third point of revolution and also connected with the body of the vehicle at a front end thereof to be pivotable relative to one another in substantially all directions of revolution for at least a certain small amount of revolution for at least a certain small amount of revolution for at least a certain small amount of revolution about a fourth point of revolution;

wherein a first phantom straight line which passes said first point of revolution and said second point of revolution and a second phantom straight line which passes said third point of revolution and said fourth point of revolution substantially traverse a third phantom straight line passing a center of the pivotable connection of said inboard end of said lower arm with the vehicle body on a front side of said lower arm, said third phantom straight line substantially traversing said first axis of revolution on a rear side of said lower arm.

2. A suspension device according to claim 1, wherein said lower arm has a main body extending substantially horizontally from said inboard end thereof to said outboard end thereof and an arm portion extending substantially vertically from an outboard portion of said main body, and at least one of said first and second strut members is connected with said lower arm at said arm portion thereof.

3. A suspension device according to claim 1, wherein said second strut member is provided by an outboard portion of a stabilizer which includes a central portion integrally supporting a pair of said outboard portions thereof at opposite ends thereof for suppressing rolling of the body of the vehicle by reacting the bounding or rebounding of one of a pair of vehicle wheels against the rebounding or bounding of the other of said pair of vehicle wheels, respectively.

4. A suspension device according to claim 1, wherein said upper arm is an A-type arm having two leg portions joined integrally with one another at said outboard end thereof, free ends of said two leg portions providing said inboard end thereof.

5. A suspension device according to claim 1, wherein said carrier and said upper arm are connected to be pivotable relative to one another also about a substantially vertical axis of revolution, while said carrier and said lower arm are also connected to be pivotable relative to one another also about a substantially vertical axis of revolution, so that the suspension device is operable to steer the vehicle.

* * * * *